US011746865B2

(12) United States Patent
Kopecek

(10) Patent No.: US 11,746,865 B2
(45) Date of Patent: Sep. 5, 2023

(54) COMPOUND ROTARY ACTUATOR WITH SEPARATELY COMMANDED LOCK ACTUATION

(71) Applicant: Woodward, Inc., Fort Collins, CO (US)

(72) Inventor: Joseph Thomas Kopecek, Santa Clarita, CA (US)

(73) Assignee: Woodward, Inc., Fort Collins, CO (US)

( * ) Notice: Subject to any disclaimer, the term of this patent is extended or adjusted under 35 U.S.C. 154(b) by 36 days.

(21) Appl. No.: 17/475,892

(22) Filed: Sep. 15, 2021

(65) Prior Publication Data

US 2023/0078445 A1   Mar. 16, 2023

(51) Int. Cl.
*F16H 25/24* (2006.01)
*E05B 47/00* (2006.01)
*F15B 15/26* (2006.01)
*F16H 25/20* (2006.01)

(52) U.S. Cl.
CPC ..... *F16H 25/2454* (2013.01); *E05B 47/0012* (2013.01); *F15B 15/261* (2013.01); *E05B 2047/0017* (2013.01); *E05B 2047/0022* (2013.01); *F16H 2025/2078* (2013.01)

(58) Field of Classification Search
CPC ..... F16H 2025/2087; F16H 2025/2075; F16H 1/28; F16H 37/082; F16H 3/64; F16H 3/62; F16H 2025/2078; F16H 25/2454; E05B 2047/022; E05B 2047/0017; E05B 47/0012; F15B 15/261
USPC ........................................................ 475/323
See application file for complete search history.

(56) References Cited

U.S. PATENT DOCUMENTS

| | | | | |
|---|---|---|---|---|
| 4,240,332 A | * | 12/1980 | Deutsch | F15B 15/261 92/24 |
| 4,463,661 A | * | 8/1984 | Tootle | F15B 15/261 92/25 |
| 4,603,594 A | * | 8/1986 | Grimm | F16H 25/20 188/106 P |
| 4,703,683 A | * | 11/1987 | Sue | F15B 15/261 92/24 |

(Continued)

FOREIGN PATENT DOCUMENTS

| | | | | |
|---|---|---|---|---|
| DE | 29802536 | | 6/1999 | |
| GB | 2435877 A | * | 9/2007 | ............. B64C 13/28 |

(Continued)

OTHER PUBLICATIONS

International Search Report and Written Opinion in International Application No. PCT/US2022/076303, dated Jan. 12, 2023, 23 pages.

(Continued)

*Primary Examiner* — Gregory Robert Weber
(74) *Attorney, Agent, or Firm* — Fish & Richardson P.C.

(57) ABSTRACT

The subject matter of this specification can be embodied in, among other things, a rotary lock assembly that includes an epicyclic gear assembly that includes a sun gear assembly having a sun gear axial aperture defined therein, a ring gear assembly, and a planet gear assembly mechanically engaged to the sun gear assembly and to the ring gear assembly, a lock motor configured to urge rotation of the sun gear assembly, and a screw lead extending axially through the sun gear axial aperture.

22 Claims, 13 Drawing Sheets

(56) References Cited

U.S. PATENT DOCUMENTS

| | | | | |
|---|---|---|---|---|
| 4,742,758 | A * | 5/1988 | Della Rocca | F15B 15/261 |
| | | | | 92/24 |
| 5,267,760 | A * | 12/1993 | Carlin | F02K 1/766 |
| | | | | 292/201 |
| 7,347,115 | B2 * | 3/2008 | Otaki | F16D 65/28 |
| | | | | 74/89.37 |
| 8,715,132 | B2 * | 5/2014 | Kopecek | F02K 1/766 |
| | | | | 475/329 |
| 8,844,389 | B2 * | 9/2014 | Kopecek | F16H 25/2015 |
| | | | | 244/102 R |
| 9,422,888 | B2 * | 8/2016 | Werquin | F16H 25/20 |
| 10,689,097 | B2 * | 6/2020 | Nfonguem | F16H 25/205 |
| 11,015,687 | B2 * | 5/2021 | Kim | F16D 65/28 |
| | | | | 74/89.37 |
| 2007/0220998 | A1 * | 9/2007 | Kopecek | F16H 25/2454 |
| | | | | 74/89.38 |
| 2009/0090203 | A1 * | 4/2009 | Jones | F16H 25/2454 |
| | | | | 74/89.39 |
| 2022/0170536 | A1 * | 6/2022 | Kopecek | F16H 25/2454 |
| 2022/0389992 | A1 * | 12/2022 | Kopecek | F16H 25/2454 |

FOREIGN PATENT DOCUMENTS

| | | |
|---|---|---|
| JP | 2004084918 | 3/2004 |
| WO | WO 2022115290 | 6/2022 |

OTHER PUBLICATIONS

Invitation to Pay Additional Fees and, Where Applicable, Protest Fee, in International Application No. PCT/US2022/076303, dated Nov. 8, 2022, 12 pages.

\* cited by examiner

COMPOUND ROTARY ACTUATOR WITH SEPARATELY COMMANDED LOCK ACTUATION

TECHNICAL FIELD

This instant specification relates to rotary-to-linear motion conversion devices for use with aircraft cascade reverser actuators.

BACKGROUND

Conventional linear actuators have output rams that may be driven by a motor or with pneumatic or hydraulic pressure. The actuator may have a lock mechanism to retain the output ram in a fixed position. Known lock mechanisms, such as taught by Tootle in U.S. Pat. No. 4,463,661, engage an actuator synchronization system, and therefore provide only indirect locking to the output ram. Direct locking mechanisms that employ a linear actuator have been developed and typically include a multi-piece housing with increased size and mass. Such actuators include tine locks, an example of which is disclosed by Carlin in U.S. Pat. No. 5,267,760. While some tine lock arrangements may allow for a single-piece housing actuator, they have the disadvantage of using a flexing lock element with consequential fatigue considerations. Locking actuators can be operated by a rotary source rather than hydraulically or pneumatically. Present rotary source operated actuators, such as disclosed by Grimm in U.S. Pat. No. 4,603,594, have the disadvantage of requiring an electrically operated solenoid mechanism (or other mechanical input separate from the rotary source) to unlock the actuator lock before motion of the ram can commence. Ball lock mechanisms such as taught by Sue in U.S. Pat. No. 4,703,683, Deutch in U.S. Pat. No. 4,240,332 and Della Rocca in U.S. Pat. No. 4,742,758 have the disadvantage of a low external load carrying capability of the ram, because of the point contact stresses imposed on the lock balls. Linear motion lock sleeve and key arrangements, such as disclosed by Kopecek (the inventor of the present disclosure) in UK patent GB2435877, include a rotary-to-linear motion conversion mechanism for the lock sleeve and complexity associated therewith. Rotary lock sleeve and key arrangements have also been disclosed by Kopecek in U.S. Pat. No. 8,715,132. Accordingly, it would be desirable to provide a linear actuator arrangement that overcomes at least some of the problems identified above.

SUMMARY

In general, this document describes rotary-to-linear motion conversion devices. More particularly, this document describes rotary-to-linear motion conversion devices for use with aircraft cascade reverser actuators.

In an example embodiment, a rotary lock assembly includes an epicyclic gear assembly that includes a sun gear assembly having a sun gear axial aperture defined therein, a ring gear assembly, and a planet gear assembly mechanically engaged to the sun gear assembly and to the ring gear assembly, a lock motor configured to urge rotation of the sun gear assembly, and a screw lead extending axially through the sun gear axial aperture.

Various embodiments can include some, all, or none of the following features. The rotary lock assembly can include a nut engaged with the screw lead and axially movable along the screw lead in response to rotation of the screw lead. The rotary lock assembly can include a drive motor configured to urge rotation of the screw lead. A planet gear carrier of the planet gear assembly can be grounded relative to the sun gear assembly and the ring gear assembly. The rotary lock assembly can include a lock key configured for radial displacement between a first lock key configuration and a second lock key configuration, and a lock rotor configured to be rotated by the ring gear assembly between a first rotor configuration in which radial displacement of the lock key from the first lock key configuration to the second lock key configuration is prevented, and a second rotor configuration in which radial displacement of the lock key from the first lock key configuration to the second lock key configuration is permitted. The rotary lock assembly can include a lock key retainer configured to be moved linearly between a first lock key retainer configuration in which radial displacement of the lock key from the second lock key configuration to the first lock key configuration is prevented, and a second lock key retainer configuration in which radial displacement of the lock key from the second lock key configuration to the first lock key configuration is permitted. The rotary lock assembly can include a linear output assembly configured for axial movement relative to radial movement of the lock key, and having an outer surface defining a groove between a first axial groove face and a second axial groove face, and configured to receive the lock key in the first lock key configuration and be prevented from moving linearly based on mechanical interference between the lock key and at least one of the first axial groove face and the second axial groove face. The lock motor can have a motor axial aperture defined therein, wherein the screw lead extends axially through the motor axial aperture. The rotary lock assembly can include a reduction gear configured to transmit torque from the lock motor to the sun gear assembly.

In an example implementation, a method of locking a linear actuator includes receiving first torque from a first torque source at a sun gear assembly of an epicyclic gear assembly, transmitting torque from the sun gear assembly to a ring gear assembly of the epicyclic gear assembly through a planet gear assembly of the epicyclic gear assembly, receiving second torque from a second torque source at a screw extending through a sun gear aperture defined in the sun gear assembly, and urging movement of a linear output member through a nut configured for linear motion based on rotation of the screw.

Various implementations can include some, all, or none of the following features. The method can include urging radial displacement of a lock key from a first lock key configuration to a second lock key configuration based on linear movement of the linear output member. The method can include contacting, based on movement of the linear actuator, the lock key with an axial groove face of a groove defined in the linear output member and configured to receive the lock key in the first lock key configuration, and preventing linear movement of the linear output member based on interference between the lock key and the axial groove face. The method can include transmitting torque from the ring gear assembly to a lock rotor, and rotating the lock rotor from a first lock rotor configuration to a second lock rotor configuration. The lock rotor can be configured to prevent radial displacement of a lock key from a first key configuration to a second key configuration in the first lock rotor configuration, and can be configured to permit radial displacement of the lock key from the first key configuration to the second key configuration in the second lock rotor configuration. A planet gear carrier of the planet gear assembly can be grounded relative to the sun gear assembly and the ring gear assembly. The first torque source can be a lock motor having a motor axial aperture defined therein, wherein the screw extends axially through the motor axial aperture. Receiving first torque from a first torque source at a sun gear assembly of an epicyclic gear assembly can include receiving first torque from a first torque source at a reduction gear, and transmitting torque from the reduction gear to the sun gear assembly.

In another example embodiment, a linear actuator includes a housing, a rotary input member rotatably moveable relative to the housing, a linear output member axially movable between a first output position relative the housing, and a second output position relative to the housing, and a rotary lock assembly that includes an epicyclic gear assembly having a sun gear assembly having a sun gear axial aperture defined therein, a ring gear assembly, and a planet gear assembly mechanically engaged to the sun gear assembly and to the ring gear assembly, a lock motor configured to urge rotation of the sun gear assembly, and a screw lead extending axially through the sun gear axial aperture.

Various embodiments can include some, all, or none of the following features. The linear actuator can include a nut engaged with the screw lead and axially movable along the screw lead in response to rotation of the screw lead. The linear actuator can include a drive motor configured to urge rotation of the screw lead. A planet gear carrier of the planet gear assembly can be grounded relative to the sun gear assembly and the ring gear assembly. The rotary lock assembly can include a lock key configured for radial displacement between a first lock key configuration and a second lock key configuration, and a lock rotor configured to be rotated by the planet gear assembly between a first rotor configuration in which radial displacement of the lock key from the first lock key configuration to the second lock key configuration is prevented, and a second rotor configuration in which radial displacement of the lock key from the first lock key configuration to the second lock key configuration is permitted. The rotary lock assembly can include a lock key retainer configured to be moved linearly between a first lock key retainer configuration in which radial displacement of the lock key from the second lock key configuration to the first lock key configuration is prevented, and a second lock key retainer configuration in which radial displacement of the lock key from the second lock key configuration to the first lock key configuration is permitted. The rotary lock assembly can include a linear output assembly configured for axial movement relative to radial movement of the lock key, and having an outer surface defining a groove between a first axial groove face and a second axial groove face, and configured to receive the lock key in the first lock key configuration and be prevented from moving linearly based on mechanical interference between the lock key and at least one of the first axial groove face and the second axial groove face. The lock motor can have a motor axial aperture defined therein, wherein the screw lead extends axially through the motor axial aperture. The linear actuator can include a reduction gear configured to transmit torque from the lock motor to the sun gear assembly.

The systems and techniques described here may provide one or more of the following advantages. First, a system can lock linear actuators against unintended extension. Second, the system can provide more reliable unlocking operations, especially under conditions of high mechanical loads on the linear actuators. Third, the system can provide independent control of locking and actuation.

The details of one or more implementations are set forth in the accompanying drawings and the description below.

Other features and advantages will be apparent from the description and drawings, and from the claims.

DETAILED DESCRIPTION

This document describes systems and techniques for providing rotary-to-linear motion with an actuator device that can be locked to prevent unintentional movement. Some prior locking designs are limited in the amount of tension load that may be applied to the actuator ram while still allowing lock keys to unlock. The designs described in this document provide a capability to unlock the actuator under the high-tension loads that can be generated by the latest technology thrust reversers. As will be discussed in more detail below, the actuator includes a lock actuator, in order to overcome binding of lock components under high input forces. In general, the rotary-to-linear conversion function of the actuator is achieved with a multi-stage planetary gearbox, in which one stage drives the rotary-to-linear conversion, and resistance to that conversion drives a second stage that performs unlocking actions. The second stage is gear-reduced to provide increased torque to perform the unlocking, which can be helpful in situations when high linear forces can cause the locking components to bind or otherwise become difficult to unlock.

Figure 1:
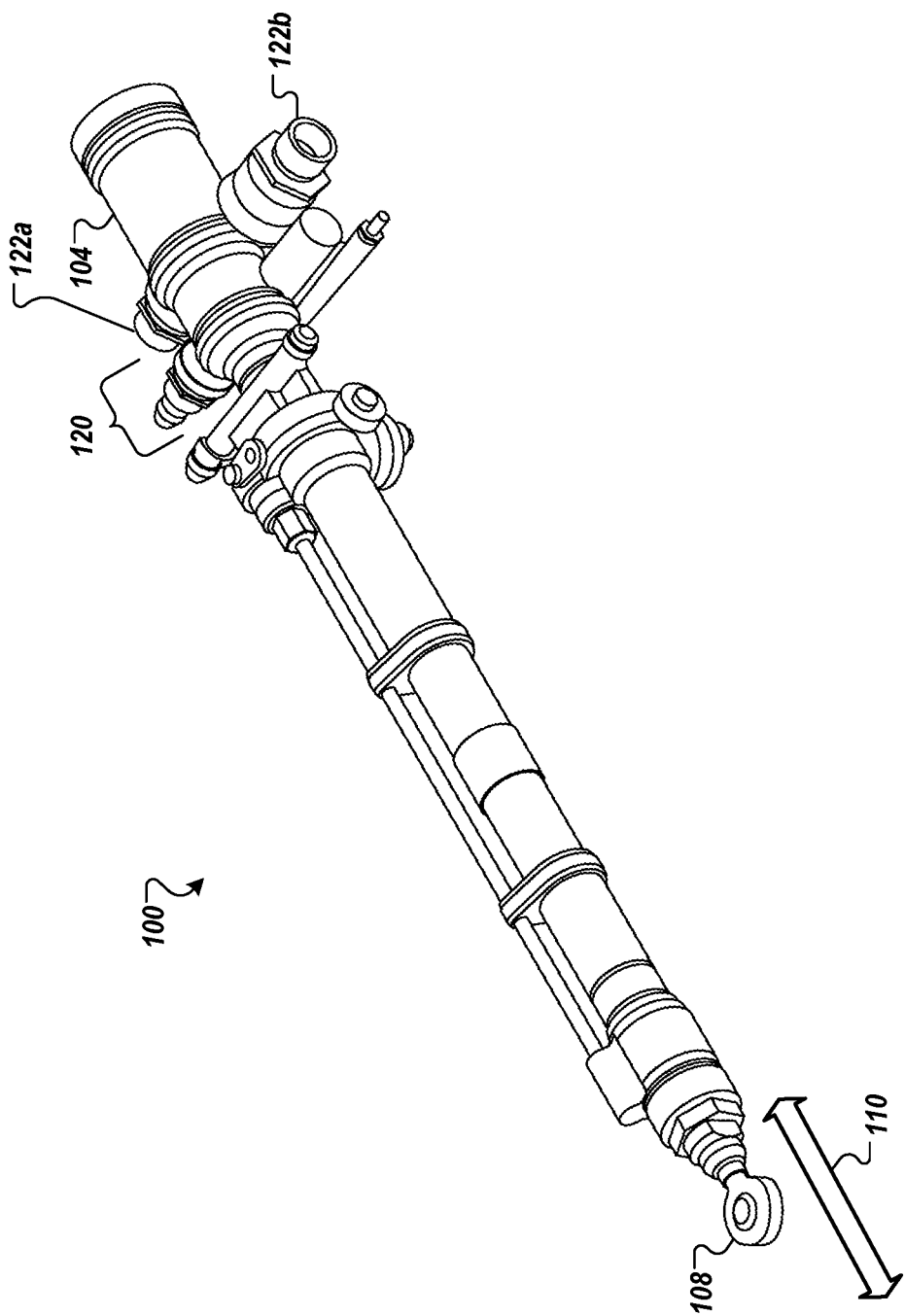
FIG. 1 shows a front perspective view of an example linear actuator.

FIG. 1 illustrates a front perspective view of an example linear actuator 100 incorporating aspects of the disclosed embodiments. The actuator 100 has an outer housing 104 and an output ram 108 (e.g., a linear output assembly). The output ram 108 is configured for axial movement or motion (depicted by direction arrow 110) into and out of the housing 104, such as from a retracted output position as shown in FIG. 1. In some embodiments, the linear actuator 100 can be part of a thrust reverser actuation system (TRAS). As a non-limiting example, the ram 108 may be attached to a door, panel, or engine thrust reverser, while the housing 104 is attached to a frame of a larger object, such as, but not limited to, an airplane. Movement of the ram 108 thereby determines the position of the door, panel, or thrust reverser, or other attaching surface.

Within the housing 104, an actuator (not shown) drives the extension and retraction of the output ram 108 based on rotational energy received from a synchronization shaft (not shown) connected to the actuator through an aperture 122*a* and/or 122*b*. This actuator will be described in more detail in the descriptions of FIGS. 2-6. In some embodiments, the linear actuator 100 can also include a sensor configured to provide positional signals or information that is representative of the linear output position (e.g., extension or retraction) of the output ram 108.

When the output ram 108 is retracted into the housing 104, a locking rotary actuator mechanism 120 may be locked to prevent inadvertent or unintended extension of the ram 108 from the housing 104. The locking rotary actuator mechanism 120 for the linear actuator 100 is discussed in more detail below.

Figure 2:
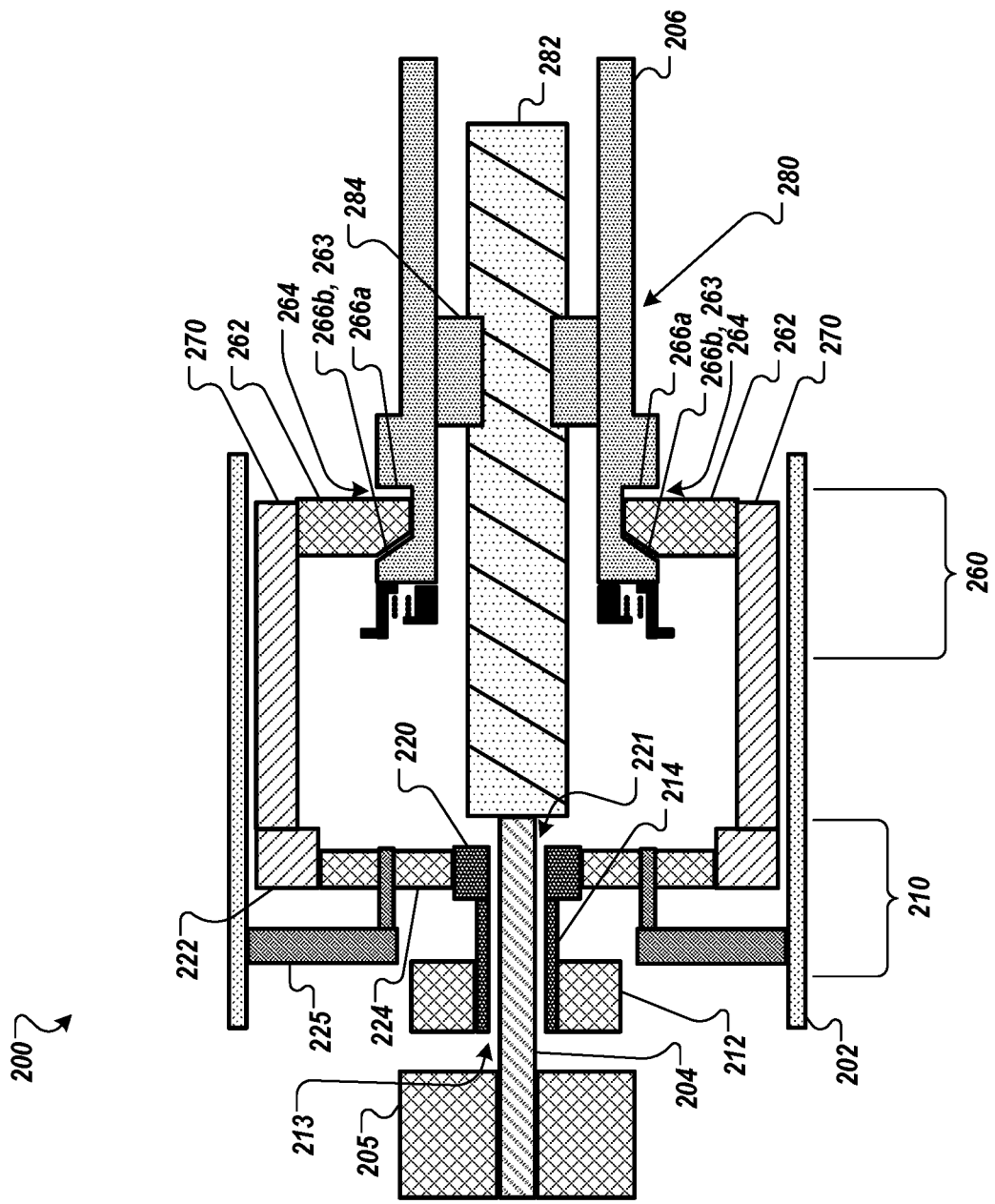
FIGS. 2 and 3 show cross section views of an example locking rotary actuator mechanism in a locked configuration.
Figure 3:
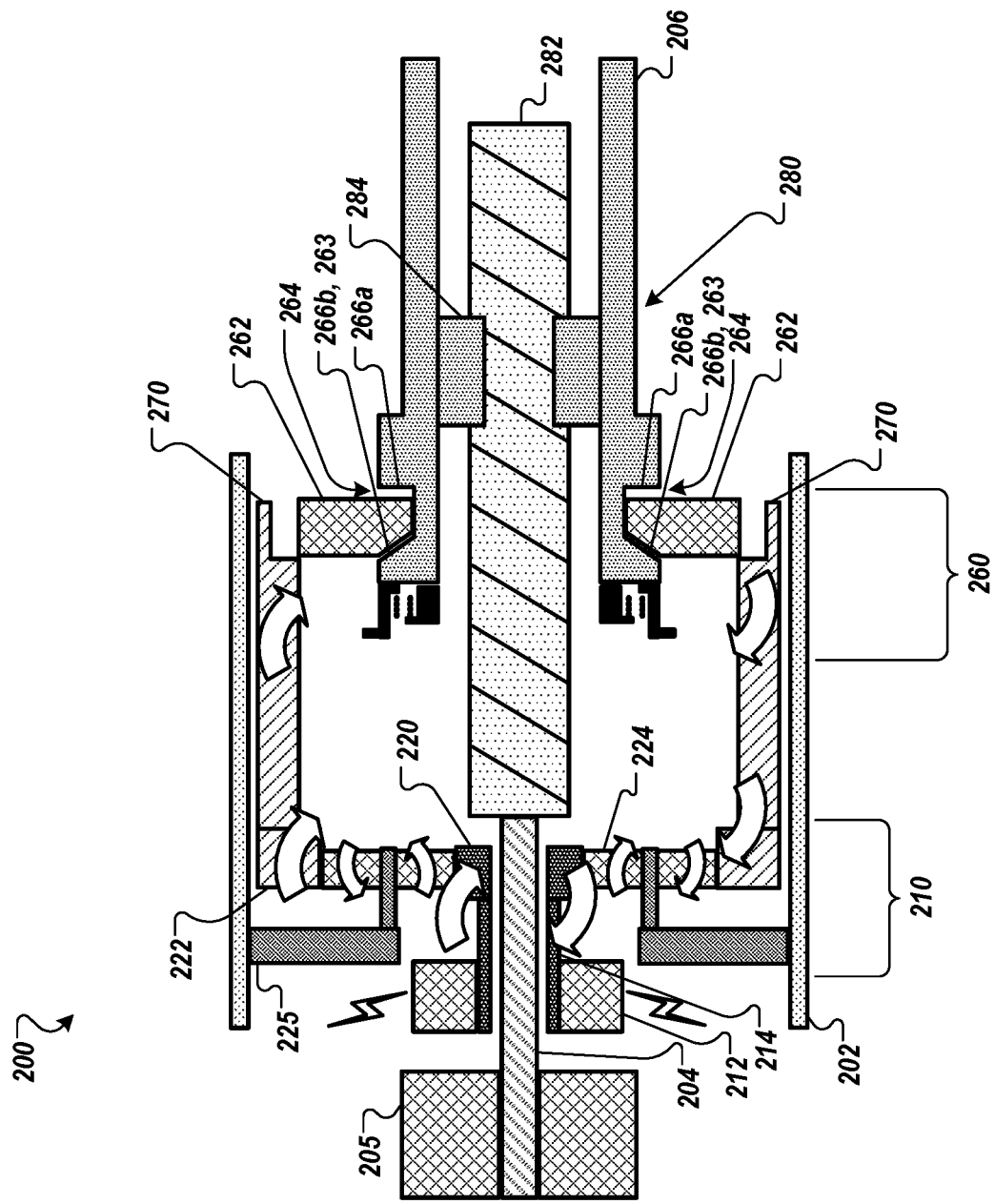

FIGS. 2 and 3 show cross section views of an example locking rotary actuator mechanism 200 in a locked configuration. In some embodiments, the locking rotary actuator mechanism 200 can be the example locking rotary actuator mechanism 120 of FIG. 1.

The locking rotary actuator mechanism 200 includes a housing 202, a rotary input shaft member 204 (e.g., a rotary input member), and a linear output assembly 206. Rotation of the rotary input shaft member 204 by a drive motor 205 urges linear motion of the linear output assembly 206 of a rotary-to-linear motion conversion assembly 280. The rotary-to-linear motion conversion assembly 280 includes a screw lead 282 that is rotated by the rotary input shaft member 204, and a nut 284 that is affixed to the linear output assembly 206 and is driven linearly as the screw lead 282 rotates.

An epicyclic gear assembly 210 includes a sun gear assembly 220, a ring gear assembly 222, and a planet gear assembly 224. The sun gear assembly is configured to be rotationally driven by a lock motor 212 through a shaft 214. A planet gear carrier 225 is grounded to the housing 202 and connects the planet gear assembly 224 to the lock rotor 270, such that rotation of the shaft 214 by the lock motor 212 can urge rotation of the planet gear assembly 224, and rotation of the planet gear assembly 224 can urge rotation of the ring gear assembly 222 and the lock rotor 270.

The lock motor 212 defines a motor axial aperture 213, and the sun gear assembly 220 defines a sun gear axial aperture 221. The rotary input shaft member 204 extends from the drive motor 205, axially through the motor axial aperture 213 and the sun gear axial aperture 221, to the screw lead 282.

A rotary lock assembly 260 includes a collection of lock keys 262 that are configured for radial displacement and to engage with a groove 264 defined in a radially outer surface of the linear output assembly 206. The groove 264 includes an axial groove face 266*a* and an axial groove face 266*b*. The axial groove face 266*b* is configured with a bevel that is complimentary to a bevel 263 of the lock key 262. In some embodiments, the bevel 263 is angled typically about 25 degrees from the radially outward direction. When locked, the lock keys 262 prevent the linear output assembly 206 from extending by contacting the axial groove face 266*b*. The lock keys 262 are prevented from moving radially out of the locked position by a lock rotor 270. The lock rotor 270 can be partly rotated to selectively prevent and permit radial movement of the lock keys 262. The lock rotor 270 is discussed in more detail in the description of FIG. 12.

Referring now to FIG. 3, the example locking rotary actuator mechanism 200 is shown in an initial state of unlocking. In the illustrated example, a high tension loading exists on the linear output assembly 206. High tension loads imposed on the linear output assembly 206 (e.g., by advanced technology thrust reversers) during the unlocking process can create a frictional force between the lock keys 262 and the lock rotor 270 that is high enough to prevent rotation of the lock rotor 270 during the unlocking process. Without the help of additional mechanical force provided by the epicyclic gear assembly 210 and the lock motor 212, such frictional forces could prevent unlocking in some circumstances. With the linear output assembly 206 locked, the rotary-to-linear motion conversion assembly 280 is substantially prevented from operating and the screw lead 282 is substantially prevented from rotating.

The lock motor 212 is energized to rotate the shaft 214. Rotation of the shaft 214 urges rotation of the sun gear assembly 220. The torque provided by the sun gear assembly 220 is transmitted through the planet gear assembly 224 (e.g., which is grounded by the planet gear carrier 225) to the ring gear assembly 222. The ring gear assembly 222 rotates, urging rotation of the lock rotor 270. In the illustrated example, substantially all of the torque provided at the shaft 214 is transmitted to the lock rotor 270, and the epicyclic gear assembly 210 provides a gear reduction that multiplies the force that is available to overcome friction between the lock keys 262 and the lock rotor 270.

Figure 4:
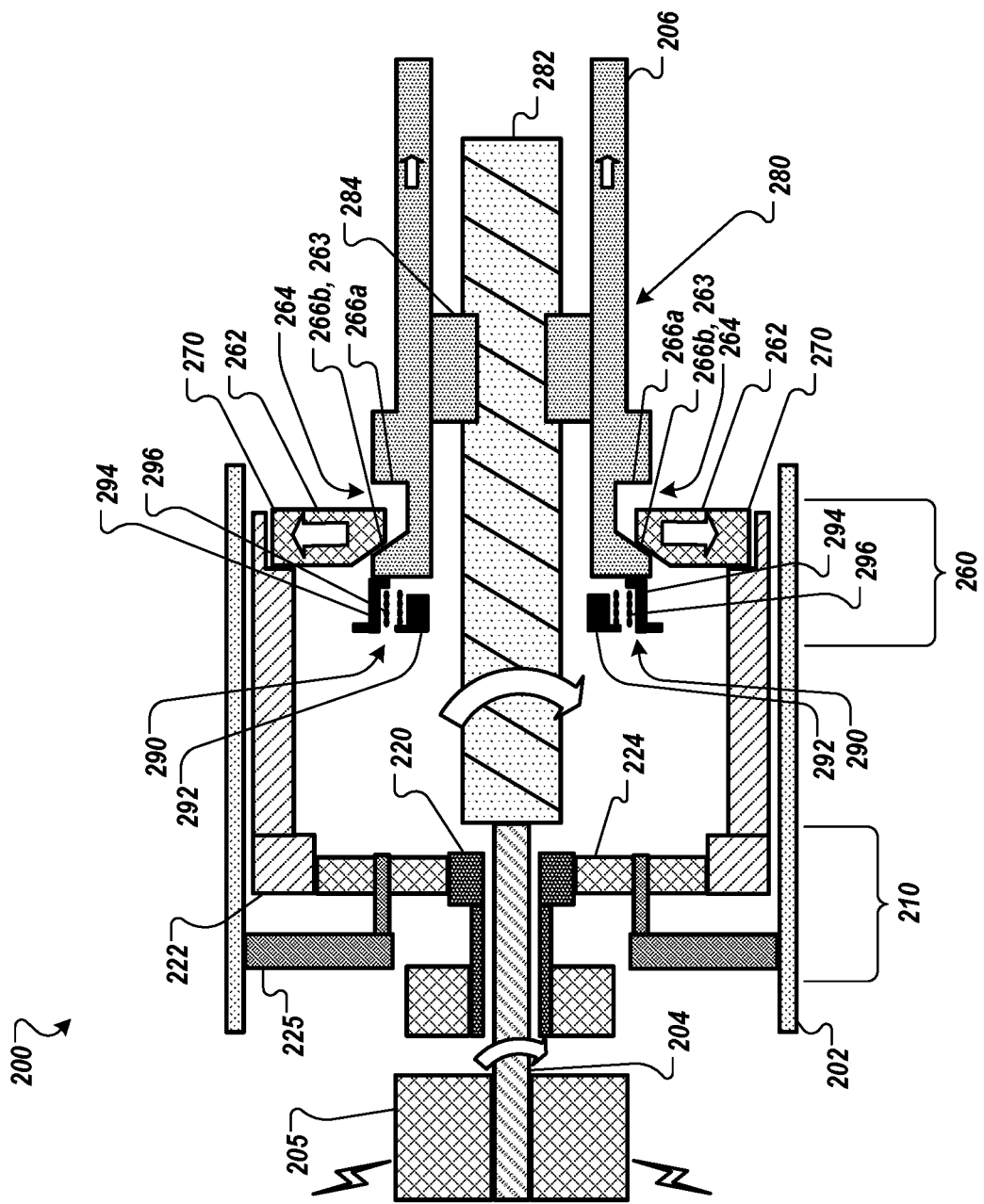
FIG. 4 shows a cross section view of the example locking rotary actuator mechanism in a partly unlocked configuration.

FIG. 4 shows a cross section view of the example locking rotary actuator mechanism 200 in a partly unlocked configuration. Once the friction between the lock keys 262 and the lock rotor 270 has been overcome, the lock rotor 270 can begin to rotate such that the lock keys 262 are permitted to move radially outward. With the lock keys 262 being able to move, the linear output assembly 206 and the rotary-to-linear motion conversion assembly 280 are also able to start moving.

The drive motor 205 is energized (e.g., via electric power, fluid power) to urge rotation of the rotary input shaft member 204 and the screw lead 282. Rotation of the screw lead 282 urges linear movement of the linear output assembly 206. Movement of the linear output assembly 206 causes mechanical interference between the axial groove face 266*b* and the bevel 263, which urges radially outward movement of the lock keys 262.

Also visible in FIG. 4 is a lock key retainer 290 configured to be moved linearly between a first lock key retainer configuration in which radial displacement of the lock keys 262 from the unlocked position to the locked position is prevented, and a second lock key retainer configuration in which radial displacement of the lock key 262 from the unlocked position to the locked position is permitted. The lock key retainer 290 includes a stationary portion 292 that is directly or indirectly affixed to the housing 202 to remain substantially unmoved relative to movement of the linear output assembly 206. The lock key retainer 290 also includes a moveable portion 294 that is configured to move linearly relative to the stationary portion 292 and relative to radial movement of the lock key 262. The lock key retainer 290 also includes a bias member 296 (e.g., a spring) that is partly compressed between the stationary portion 292 and the moveable portion 294, to urge the moveable portion 294 into contact with the linear output assembly 206. In the illustrated example, the lock key retainer 290 is compressed and inactive, but the function of the lock key retainer 290 will be discussed further in the description of FIG. 5.

Figure 5:
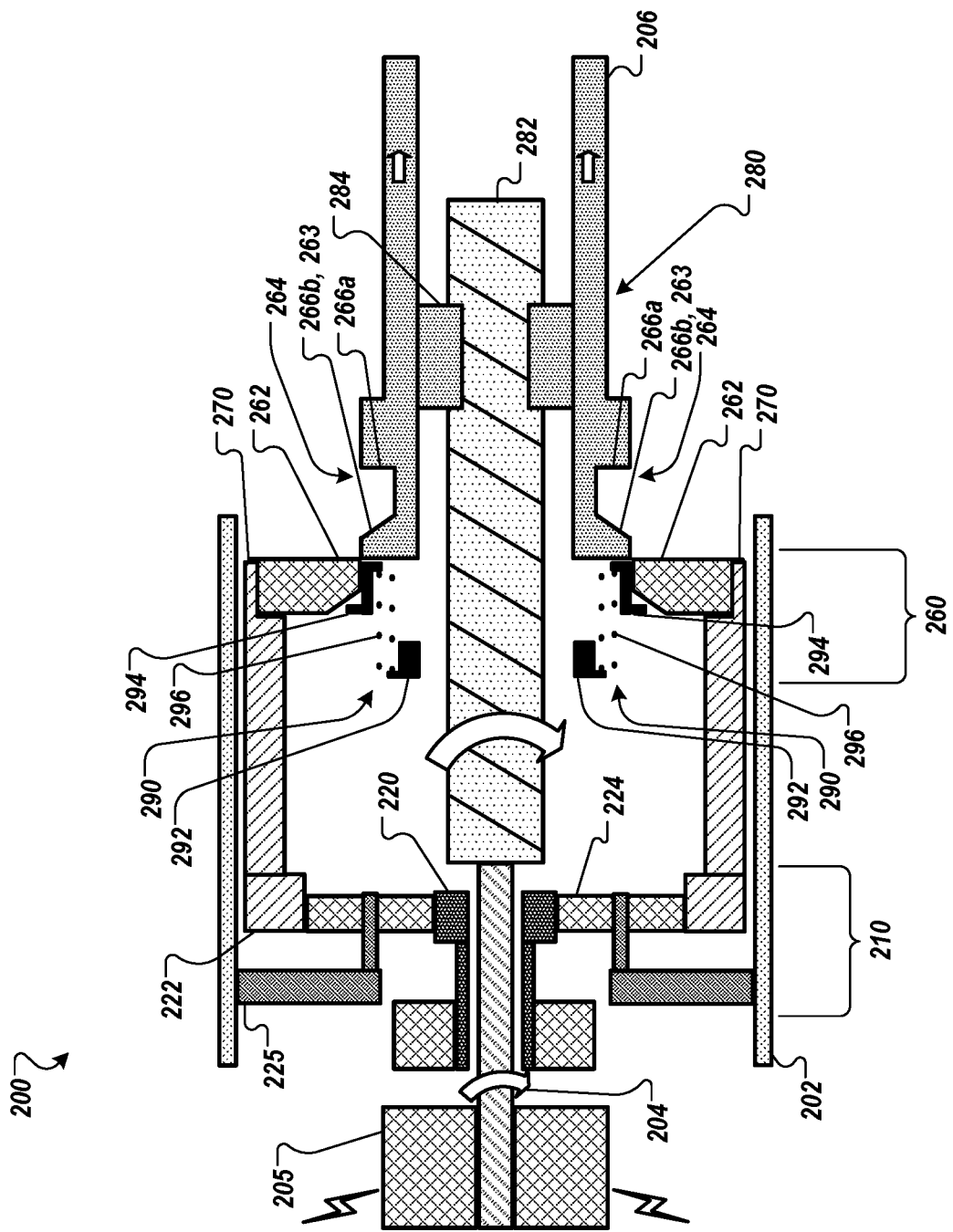
FIGS. 5 and 6 show cross section views of the example locking rotary actuator mechanism in an unlocked configuration.
Figure 6:
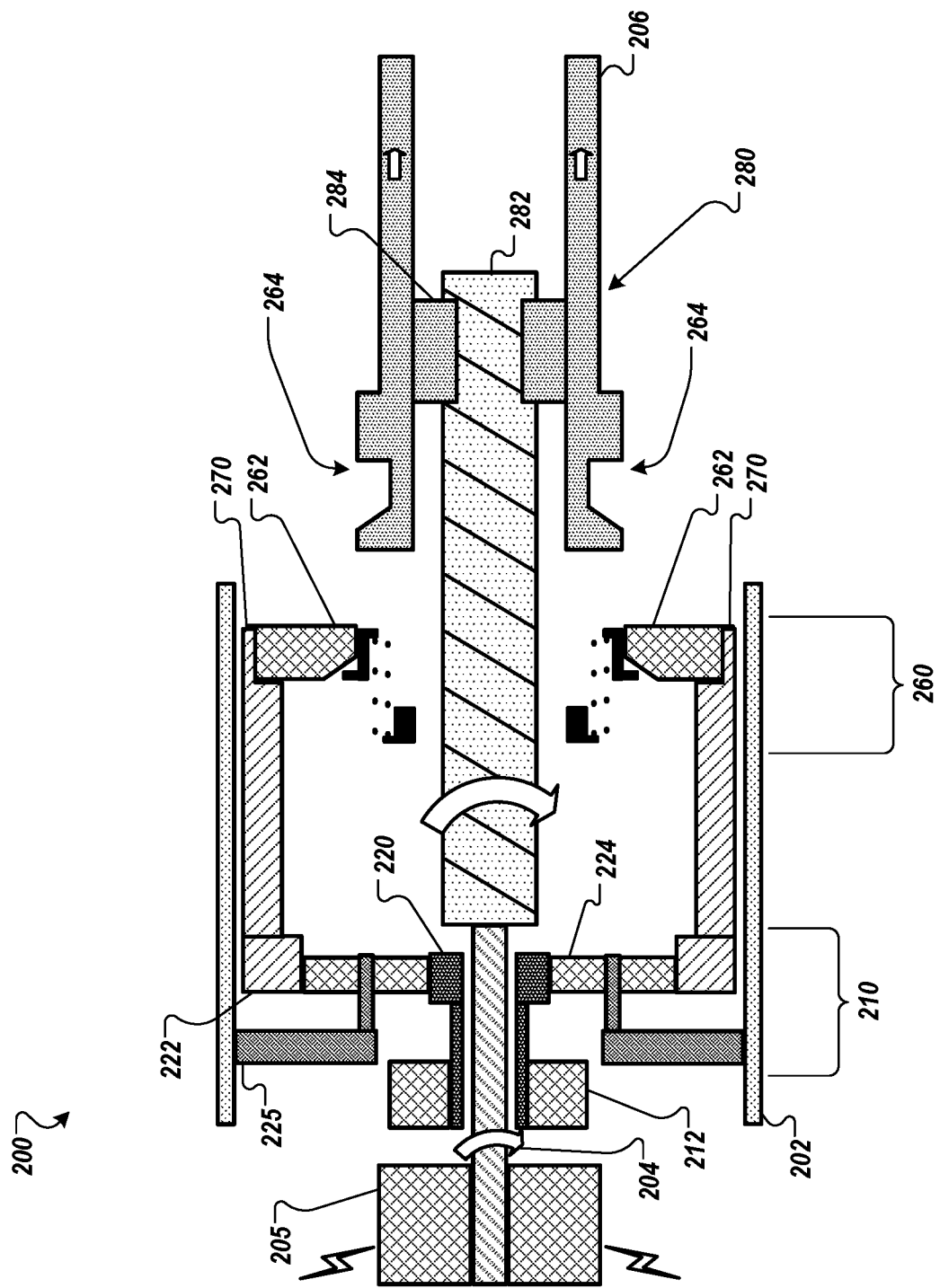

FIGS. 5 and 6 show cross section views of the example locking rotary actuator mechanism 200 in an unlocked configuration. The lock rotor 270 is configured to rotate through a limited, predetermined range of angles (e.g., about 15 degrees) between a hard stop at a position corresponding to the locked configuration (e.g., in which the lock keys 262 are able to fully escape the groove 264) and another hard stop at a position corresponding to a fully unlocked configuration (e.g., in which the lock keys 262 are prevented from escaping the groove 264). The configuration of the lock rotor 270 is discussed in more detail in the description of FIG. 12.

In FIG. 5, the lock rotor 270 is hard stopped at the position that corresponds to the unlocked configuration. The hard stop prevents further rotation of the lock rotor 270.

As the linear output assembly 206 extends its output position, the bias member 296 expands between the stationary portion 292 and the moveable portion 294, urging the moveable portion 294 to follow the linear output assembly 206 as it extends. The moveable portion 294 provides a radial face that substantially extends the radially outermost surface of the linear output assembly 206. As the linear output assembly 206 extends beyond the axial output position location of the lock keys 262, the moveable portion 294 moves to provide a physical barrier that keeps the lock keys 262 in the radially extended, unlocked position.

In FIG. 6, the linear output assembly 206 continues to extend while the lock keys 262 are maintained in their unlocked positions. Retraction of the linear output assembly 206 is performed by reversing the operation of the drive motor 205 to reverse rotation of the rotary input shaft member 204. Reverse rotation of the rotary input shaft member 204 urges movement of the linear output assembly 206 back into contact with the moveable portion 294 to urge compression of the bias member 296 and allow the lock keys 262 to move radially out of the unlocked position toward the locked configuration within the groove 264. Once the linear output assembly 206 is fully retracted, the lock motor 212 is reversed to urge rotation of the lock rotor 270 toward the locked position. The lock rotor 270 is configured to urge the lock keys 262 to move radially inward into the groove 264 and prevent them from being displaced radially (e.g., due to tension on the linear output assembly 206).

Figure 7:
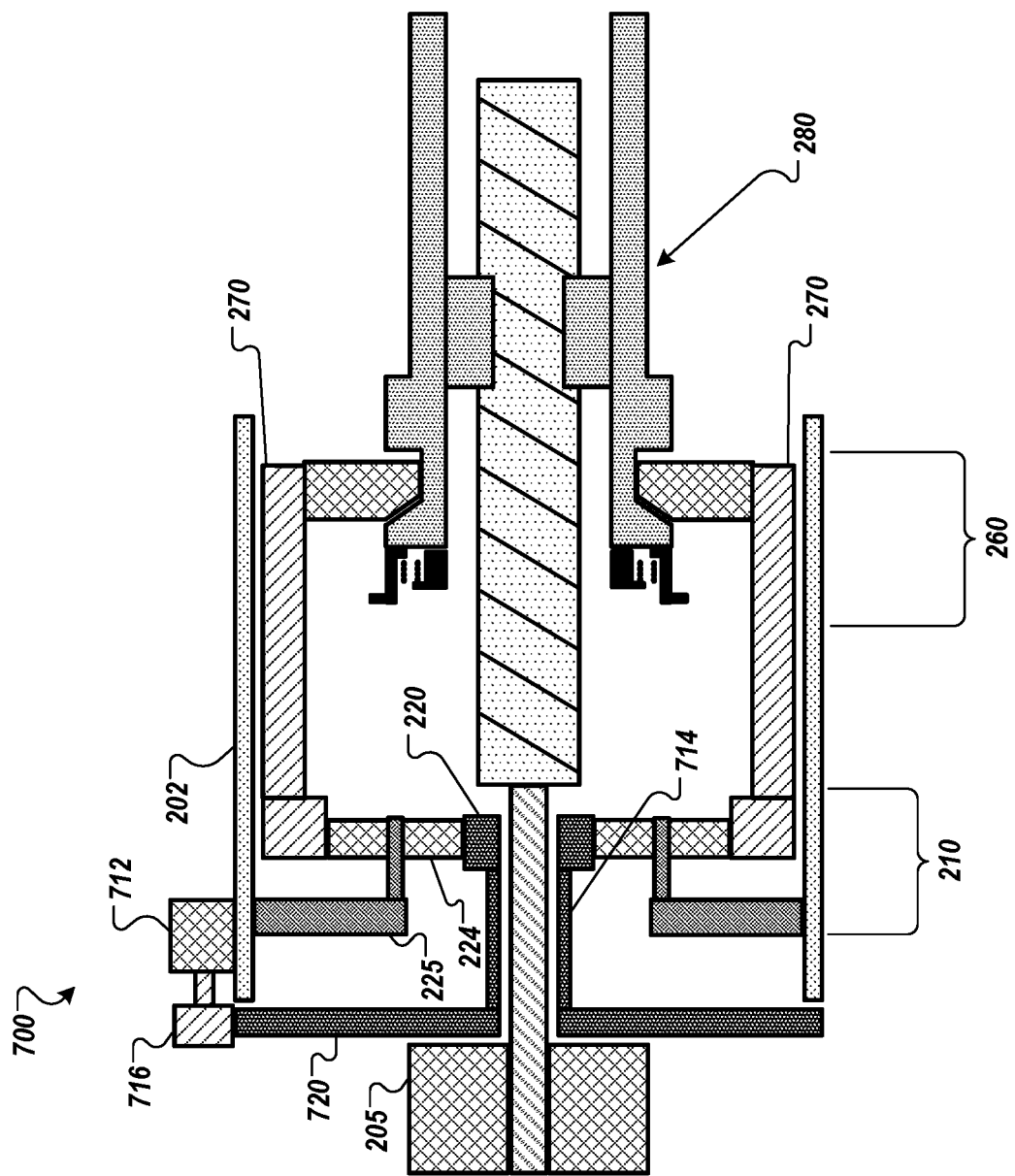
FIG. 7 shows a cross section view of another example locking rotary actuator mechanism in a locked configuration

FIG. 7 shows a cross section view of another example locking rotary actuator mechanism 700 in a locked configuration. In the illustrated example, the mechanism 700 is a modification of the example mechanism 200 of FIGS. 2-6. The mechanism 700 includes the housing 202, the rotary input shaft member 204, the linear output assembly 206, the rotary-to-linear motion conversion assembly 280, and the epicyclic gear assembly 210 having the sun gear assembly 220.

The sun gear assembly 220 is configured to be rotated by a shaft 714. The shaft 714 is rotatably affixed to a secondary gear 720. A lock motor 712 is affixed, directly or indirectly, to the housing 202 proximal an outer periphery of the housing 202. The lock motor 712 is configured to urge rotation of a primary gear 716 that is matingly engaged with the secondary gear 720. In the illustrated example, the primary gear 716 and the secondary gear 720 are arranged in a reduction gear configuration, in which torque from the lock motor 712 is transmitted to the sun gear assembly 220. In the illustrated configuration, the lock motor 712 can be energized to urge rotation of the primary gear 716. Rotation of the primary gear 716 urges rotation of the secondary gear 720, and rotation of the secondary gear 720 urges rotation of the shaft 714 and the sun gear assembly 220 to urge movement of the lock rotor 270 between the locked and unlocked positions.

Figure 8A:
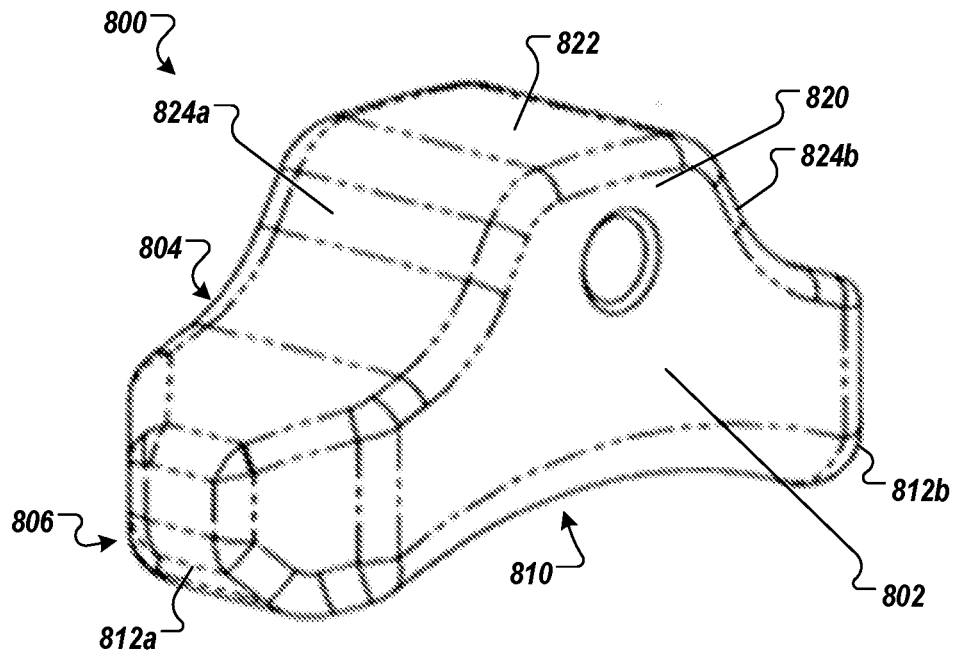
FIGS. 8A and 8B show a front perspective and a cross section view of an example lock key.
Figure 8B:
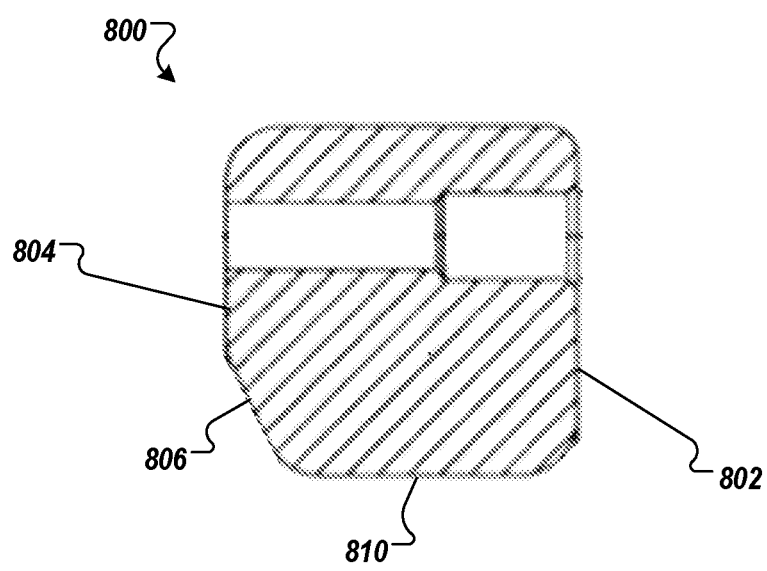

FIGS. 8A and 8B show a front perspective and a cross section view of an example lock key 800. In some embodiments, the lock key 800 can be the example lock key 262 of FIGS. 2-6. The lock key 800 has a front face 802 and a rear face 804. The rear face 804 includes a bevel 806 (e.g., angled about 25 degrees relative to the rear face). In some embodiments, the bevel 806 can be the bevel 263. In the locked configuration, the bevel 806 contacts the axial groove face 266b to prevent extension of the linear output assembly 206.

The example lock key 800 has bottom surface 810 that is configured to rest against the linear output assembly 206 in the locked configuration and rest against the moveable portion 294 of the lock key retainer 290 in the unlocked configuration. The bottom surface 810 includes bevels 812a and 812b that can guide radially inward movement of the lock key 800 (e.g., moving into locking position within the groove 264).

The lock key 800 also has a crown 820 that is configured to contact the lock rotor 270. In the locked configuration, a top surface 822 of the crown contacts an inner radius of the lock rotor 270 to retain the lock key in the radially inward, locked configuration. In the unlocked configuration, the crown 820 extends into a corresponding, radially outward recess in the lock rotor that can rotate into and out of radial alignment with the crown 820.

The crown 820 includes a radiused face 824a and a radiused face 824b. During locking, the lock rotor 270 rotates relative to the lock key 800, and the radiused faces 824a-824b act as ramps against the circumferential ends of the lock rotor recesses to urge the lock key 800 to move radially inward into the locked configuration.

FIGS. 9-12 depict an exemplary embodiment of a lock assembly 900. In some embodiments, the lock assembly 900 can be the example rotary lock assembly 260 of FIGS. 2-7. The lock assembly 900 includes an epicyclic gear assembly such as the example epicyclic gear assembly 210.

A rotary input shaft member 904 (e.g., the rotary input shaft member 204) couples a screw lead (e.g., the screw lead 282) to a motor (e.g., the drive motor 205) to provide the energy to extend and retract the linear output assembly 206. In operation, the drive motor 205 serves as the driver, and the linear output member is responsive to the rotation of the ball screw to move axially.

A sun gear 940 (e.g., the example sun gear assembly 220) of the epicyclic gear arrangement may provide the mechanical drive input to the gear assembly (e.g., from the lock motor 212 or 712). An outer diameter of the ring gear 948 (annulus, shown in FIGS. 10 and 11) of the epicyclic gear arrangement may be nested in a bearing race and directly attached to a lock rotor 916 visible in FIG. 12 (e.g., the lock rotor 270) via a rotor extension 956.

Figure 9:
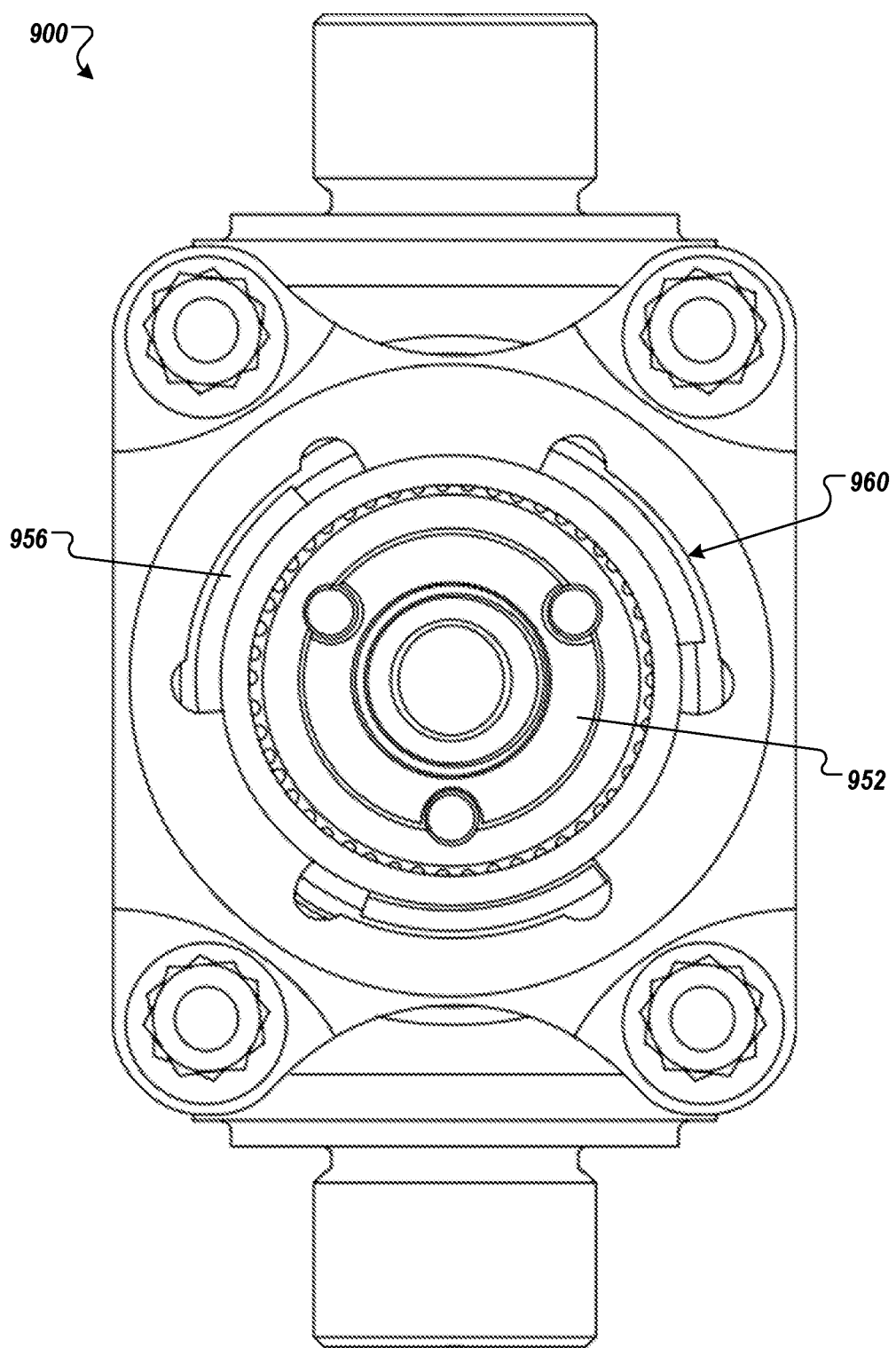
FIG. 9 shows a cross section view of the example locking rotary actuator mechanism.

In an exemplary embodiment, rotation of the lock rotor 916 to move to the unlocked position may be provided by the lock motor 212 or 712. With reference to FIG. 9, the rotor extension 956 (which is coupled to ring gear 948) acts as a key that engages a radial slot 960 that defines the rotational end stops of the lock rotor 916 from the locked to unlocked position. In some embodiments, a torsion spring may be included that directly biases the lock rotor 916 to the locked position.

In use, to extend the linear output assembly 206, energy is input (such as via the drive motor 205, for example) to the rotary shaft input member 904. Because the linear output assembly 206 is constrained from any axial motion or movement or motion by a collection of lock keys 920 (e.g., the lock keys 262), the screw lead 282 cannot turn and advance the linear output assembly 206. Therefore, the linear output assembly 206 is locked until the lost motion unlocks the lock keys 920. The unlocking of the lock keys 920 in response to rotation of the lock rotor 916 mechanically coincides with the rotor extension 956 bottoming out in the radial slot 960. Bottoming out of the rotor extension 956 in the radial slot 960, allows for unlocking of the lock keys 920.

To retract the linear output assembly 206 and rotate the lock rotor 916 to the locked position, this process is reversed. The motor driving the rotary input shaft member 904 reverses direction and the linear output assembly 206 is returned to its retracted configuration. The motor driving the sun gear 940 reverses direction. The ring gear 948 reverses the load direction and attempts to rotate the lock rotor 916 from the unlocked position to the locked position. However, the lock keys 920 are constrained in the withdrawn position within the grooves 938 of the lock rotor 916 by the lock key retainer 290, and thereby prevent any rotation of the lock rotor 916. This effectively locks the ring gear 948 (e.g., via rotor extensions 956).

In response to the linear output assembly 206 coming to the fully retracted position, the lock key retainer 290 is pushed out of the way (axially) by the linear output assembly 206 and the lock keys 920 are aligned with the groove 264 in the linear output assembly 206. This now allows the lock rotor 916 to rotate from the unlocked to the locked position, pushing the lock keys 920 radially inward into the groove 264, thus re-locking the linear output assembly 206.

Figure 10:
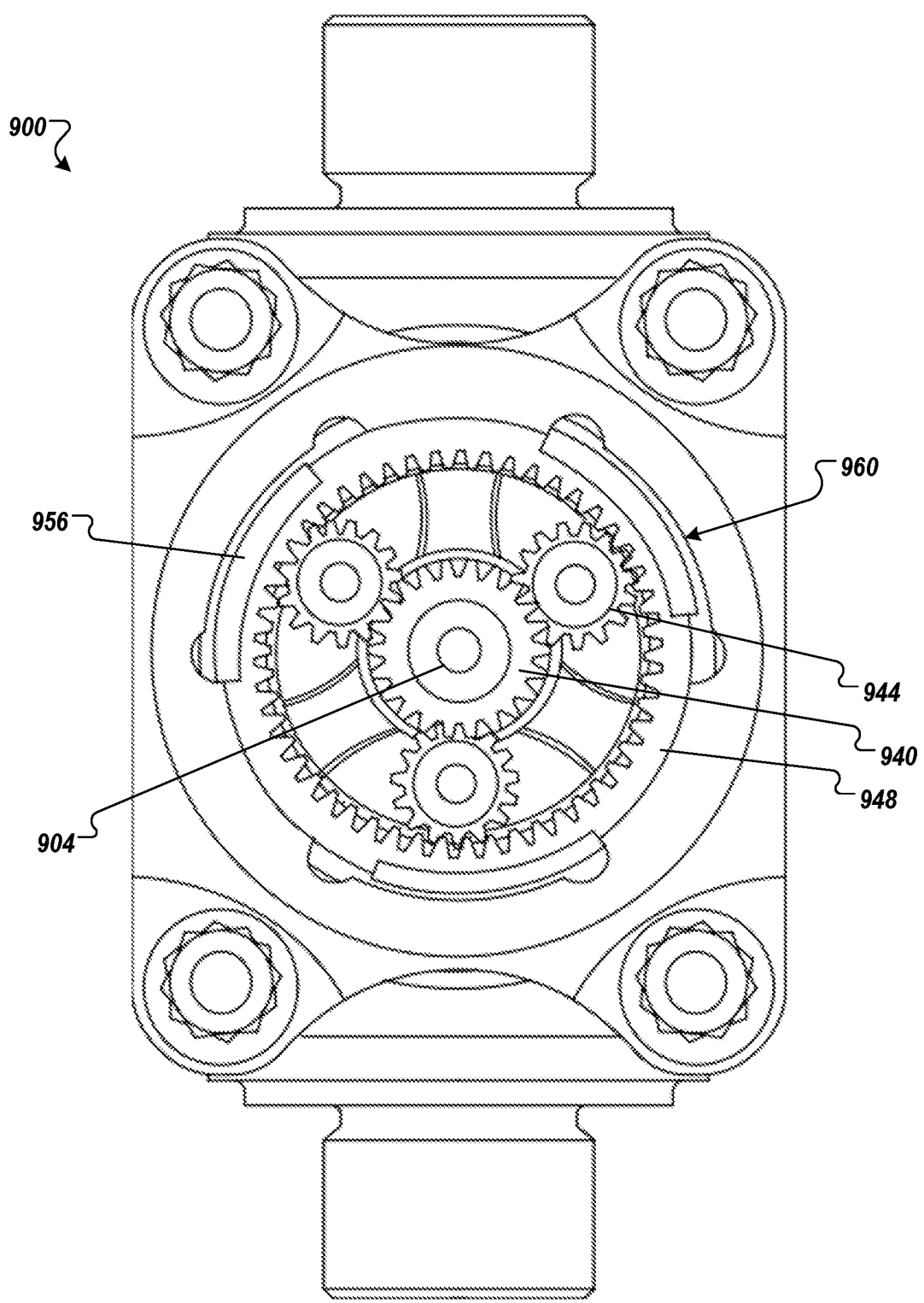
FIG. 10 shows another cross section view of the example locking rotary actuator mechanism.
Figure 11:
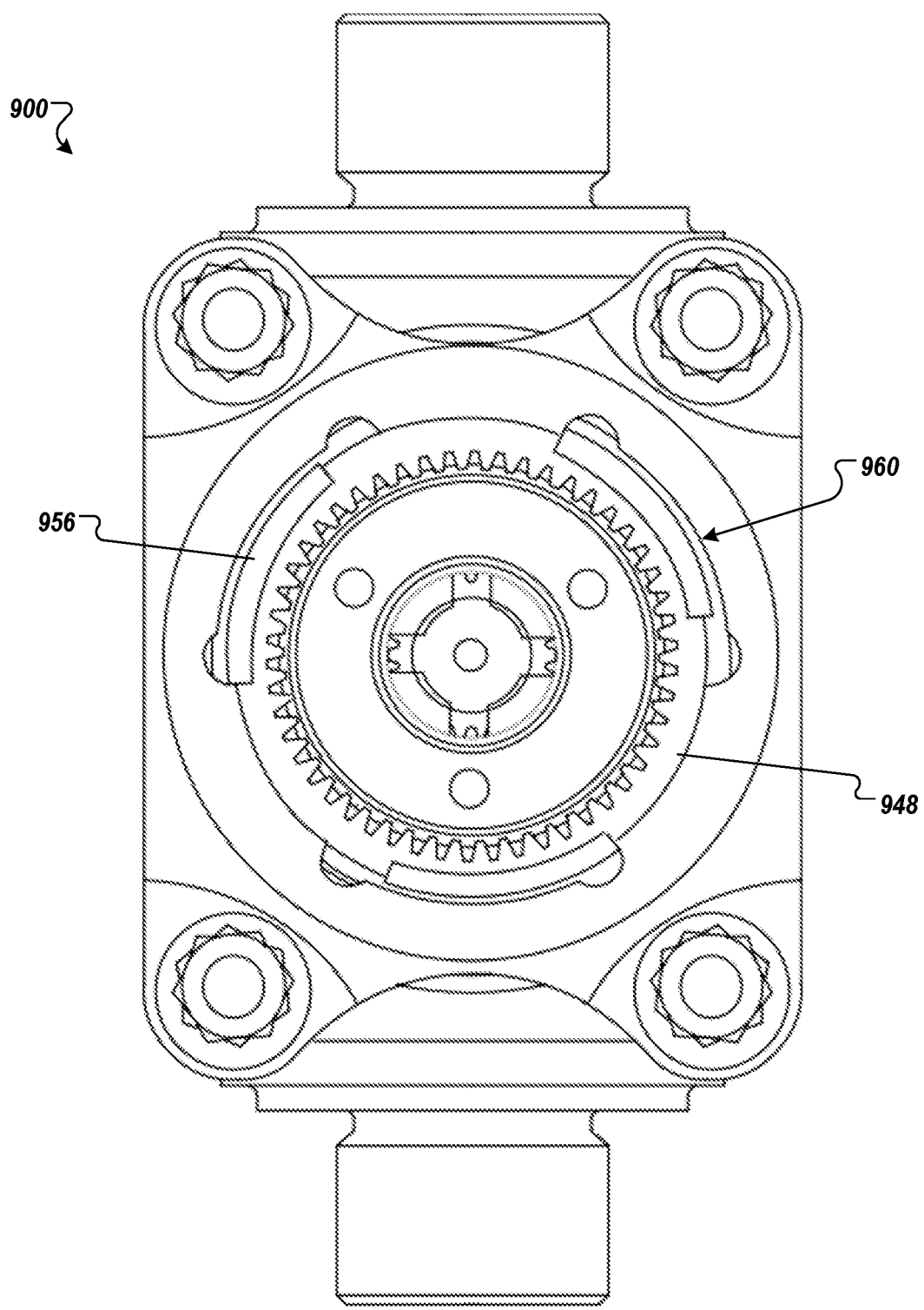
FIG. 11 shows another cross section view of the example locking rotary actuator mechanism.
Figure 12:
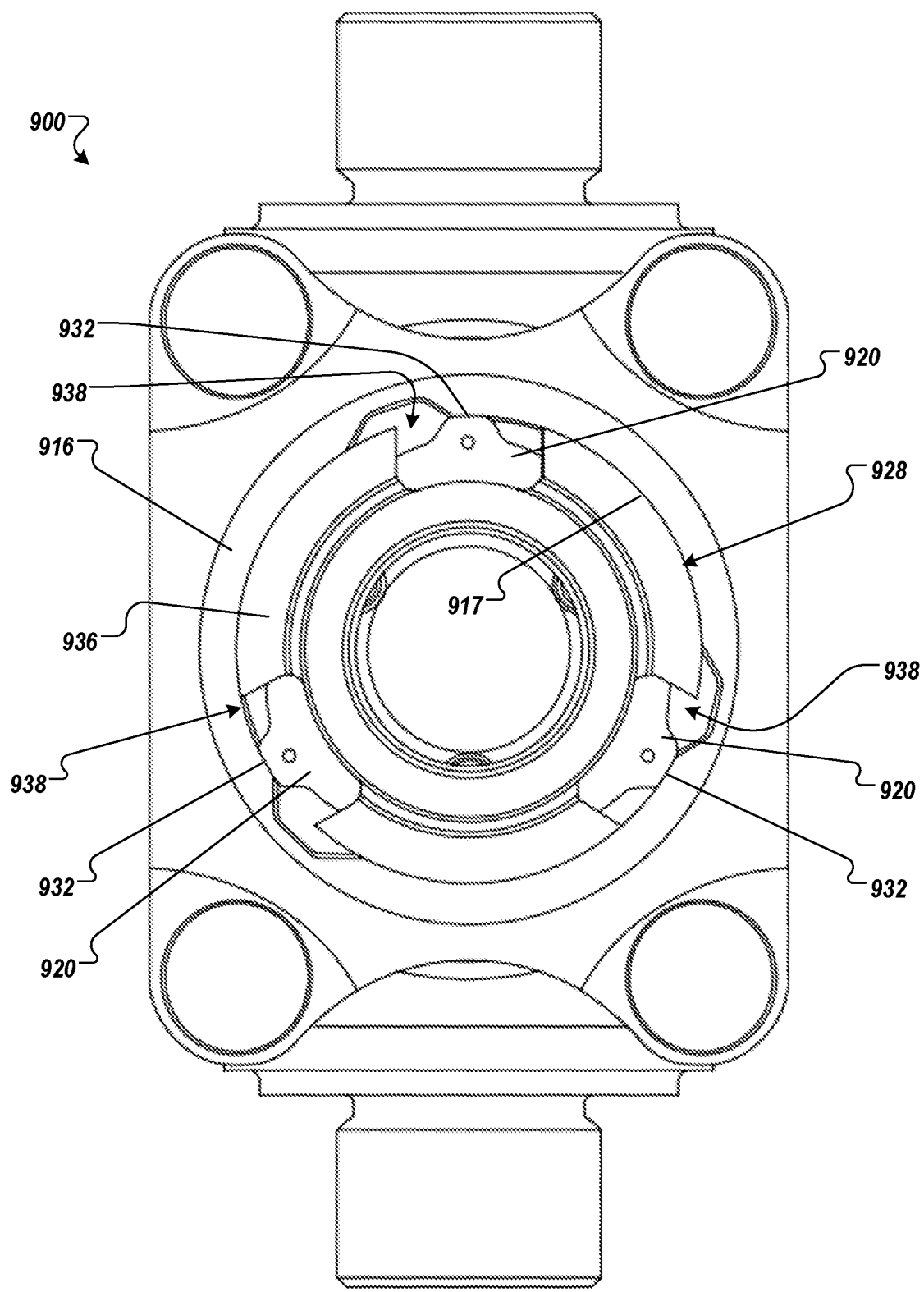
FIG. 12 shows another cross section view of the example locking rotary actuator mechanism.

To increase clarity, additional cross sectional figures of the lock assembly 900 as described herein and shown in FIG. 9 are provided. FIG. 10 depicts a cross section view of the epicyclic arrangement shown in FIG. 9 including the sun gear 940, planet gear 944, ring gear 948, and planet carrier 952. FIG. 11 depicts a cross section view of the epicyclic arrangement shown in FIG. 9 including the ring gear 948, planet carrier 952, and rotor extension 956. FIG. 12 depicts a cross section view of the lock rotor 916 with lock keys 920 in the locked position.

As shown in FIG. 12, the lock rotor 916 is disposed coaxially with the linear output assembly 206, and includes a bore 928 having an inner surface 917 that interfaces with a crown 932 of the lock key 920. A lock ring 936 is grounded (e.g., fixed relative to the housing) and includes radial grooves 938 that guide the lock keys 920 and restrict their displacement to radial motion. In an exemplary embodiment, an inside radius of the bore 928 will be approximately equal to an outside radius of the crown 932 when the lock key 920 is engaged with the radial groove 938. In use, in response to the lock rotor 916 being disposed in the locked position of FIGS. 2 and 3, the bore 928 interfaces with the crown 932 of the lock key 920 and the lock key 920 is restrained from any outward radial motion (such as the lock key motion illustrated in FIG. 4, for example). Therefore, the lock key 920 engages and is retained or held within, the radial groove 938 of the linear output assembly 206 by the rotation of the rotary input shaft member 204.

Figure 13:
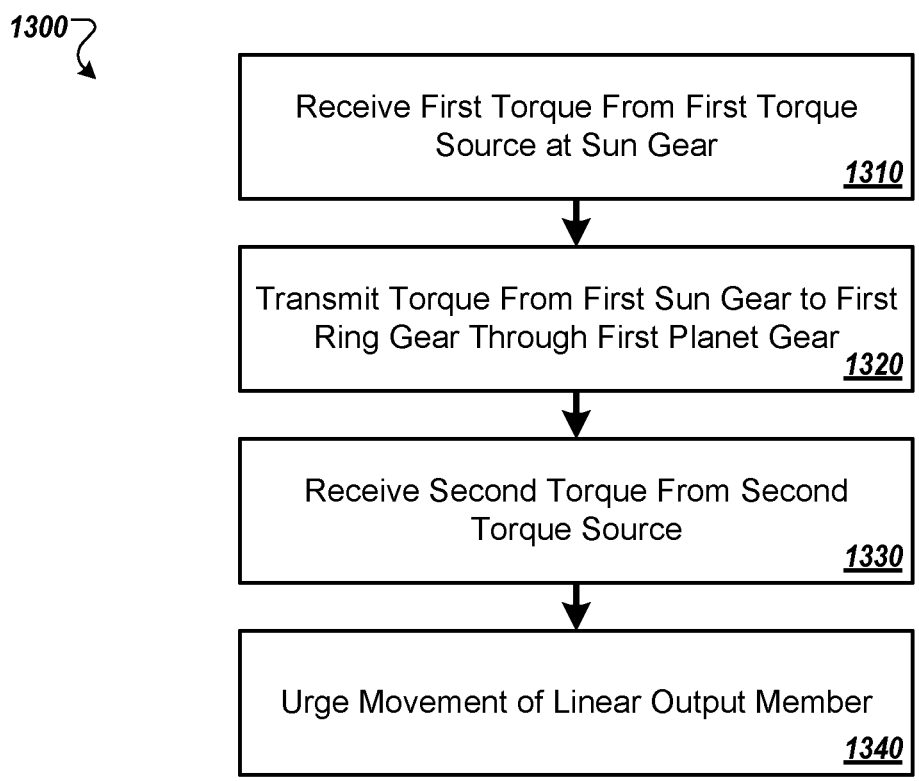
FIG. 13 shows a flow diagram of an example process for operating a linear actuator.

FIG. 13 shows a flow diagram of an example process 1300 for operating a linear actuator. In some implementations, the process 1300 can be performed by all or part of the example linear actuator 100 of FIG. 1, the example locking rotary actuator mechanism 200 of FIGS. 2-6, and/or the example locking rotary actuator mechanism 700 or FIG. 7.

At 1310, a first torque is received from a first torque source at a sun gear assembly of an epicyclic gear assembly. For example, the example lock motor 212 can provide a torque that urges rotation of the example sun gear assembly 220 of the example epicyclic gear assembly 210.

At 1320, torque is transmitted from the sun gear assembly to a ring gear assembly of the epicyclic gear assembly through a planet gear assembly of the epicyclic gear assembly. For example, torque can be transmitted from the example sun gear assembly 220 to the example ring gear assembly 222 through the planet gear assembly 224.

At 1330, a second torque is received from a second torque source at a screw extending through a sun gear aperture defined in the sun gear assembly. For example, the example drive motor 205 can transmit torque along the example rotary input shaft member 204, through the example motor axial aperture 213, to the example screw lead 282.

At 1340, movement of a linear output member through a nut configured for linear motion is urged based on rotation of the screw. For example, rotation of the example screw lead 282 through the example nut 284 can urge linear movement of the linear output assembly 206.

In some implementations, the process 1300 can also include urging radial displacement of a lock key from a first lock key configuration to a second lock key configuration based on linear movement of the linear output member. For example, the lock rotor 270 can be moved from a locked rotational position to an unlocked rotational position, which can allow the lock keys 262 to move radially outward from a locked configuration to an unlocked configuration.

In some implementations, the process 1300 can also include contacting, based on movement of the linear actuator, the lock key with an axial groove face of a groove defined in the linear output member and configured to receive the lock key in the first lock key configuration. In the first configuration, the lock key can prevent linear movement of the linear output member based on mechanical interference between the lock key and the axial groove face, and can prevent rotation of the screw based on the prevented linear movement of the linear output member. With rotation of the screw prevented, rotation of the first planet gear assembly is also prevented based on the prevented rotation of the screw, which can cause substantially all torque received at the first sun gear to be transmitted to the first ring gear. For example, the linear output assembly 206 can contact the lock keys 262 in the groove 264 to prevent further axial movement of the linear output assembly 206. With movement of the linear output assembly 206 stopped, rotation of the screw lead 282 is stopped.

In some implementations, the process 1300 can also include transmitting torque from the ring gear assembly to a lock rotor, and rotating the lock rotor from a first lock rotor configuration to a second lock rotor configuration. For example, rotation of the ring gear assembly 222 can urge rotation of the lock rotor 270 from a locked rotational position to an unlocked rotational position, or from the unlocked rotational position to the locked rotational position In some implementations, the first lock rotor configuration can be a first rotational position defined by a first lock rotor end stop configured to mechanically interfere with rotation of the lock rotor in a first direction, and the second lock rotor configuration is a second rotational position defined by a second lock rotor end stop configured to mechanically interfere with rotation of the lock rotor in a second direction opposite the first direction. For example, the example radial slot 960 can define the rotational end stops of the lock rotor 916 from the locked to unlocked position.

In some implementations, the lock rotor can be configured to prevent radial displacement of a lock key from a first key configuration to a second key configuration in the first lock rotor configuration, and is configured to permit radial displacement of the lock key from the first key configuration to the second key configuration in the second lock rotor configuration. For example, FIG. 12 shows that the lock rotor 916 includes grooves 938 that guide the lock keys 920 and restrict their displacement to radial motion. In response to the lock rotor 916 being disposed in the locked position of FIGS. 2 and 3, the bore 928 can interface with the crown 932 of the lock key 920 and the lock key 920 can be restrained from any outward radial motion (such as the lock key motion illustrated in FIG. 4, for example). Therefore, the lock key 920 engages and is retained or held within, the radial groove 938 of the linear output assembly 206 by the rotation of the rotary input shaft member 204. When the lock rotor 916 is rotated to bring the grooves 938 into radial alignment with the crowns 932, the lock keys 920 have sufficient space to move radially outward, out of contact with (and thus unlocking) the linear output assembly 206.

In some implementations, a planet gear carrier of the planet gear assembly can be grounded relative to the sun gear assembly and the ring gear assembly. For example, the planet gear carrier 225 can be grounded to the housing 202, which grounds the planet gear carrier 225 relative to the sun gear assembly 220 and the ring gear assembly 222.

In some implementations, the first torque source can be a lock motor having a motor axial aperture defined therein, where the screw extends axially through the motor axial aperture. For example, the lock motor 212 has the motor axial aperture 213 defined axially within the lock motor 212, and rotary input shaft member 204 extends the screw lead 282 to the drive motor 205 through the motor axial aperture 213.

In some implementations, receiving a first torque from a first torque source at a sun gear assembly of an epicyclic gear assembly can include receiving a first torque from a first torque source at a reduction gear, and transmitting torque from the reduction gear to the sun gear assembly. For example, in the example locking rotary actuator mechanism 700 of FIG. 7, the sun gear assembly 220 receives torque from the lock motor 712 through the primary gear 716 and the secondary gear 720, where the primary gear 716 and the secondary gear 720 are arranged to provide a gear reduction that amplifies the torque provided by the lock motor 712. In some implementations, by implementing a gear reduction to reduce the amount of torque needed from the lock motor 712, the lock motor 712 can be selected with a reduced size, weight, and or cost while still being capable of providing sufficient torque to urge locking and unlocking of the example rotary lock assembly 260.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A rotary lock assembly comprising:
   an epicyclic gear assembly comprising:
   a sun gear assembly having a sun gear axial aperture defined therein;
   a ring gear assembly; and
   a planet gear assembly mechanically engaged to the sun gear assembly and to the ring gear assembly;
   a lock motor configured to urge rotation of the sun gear assembly;
   a screw lead extending axially through the sun gear axial aperture;
   a lock key configured for radial displacement between a first lock key configuration and a second lock key configuration; and
   a lock rotor configured to be rotated by the ring gear assembly between a first rotor configuration in which radial displacement of the lock key from the first lock key configuration to the second lock key configuration is prevented, and a second rotor configuration in which radial displacement of the lock key from the first lock key configuration to the second lock key configuration is permitted.

2. The rotary lock assembly of claim 1, further comprising a nut engaged with the screw lead and axially movable along the screw lead in response to rotation of the screw lead.

3. The rotary lock assembly of claim 1, further comprising a drive motor configured to urge rotation of the screw lead.

4. The rotary lock assembly of claim 1, wherein a planet gear carrier of the planet gear assembly is grounded relative to the sun gear assembly and the ring gear assembly.

5. The rotary lock assembly of claim 1, further comprising:
   a lock key retainer configured to be moved linearly between a first lock key retainer configuration in which radial displacement of the lock key from the second lock key configuration to the first lock key configuration is prevented, and a second lock key retainer configuration in which radial displacement of the lock key from the second lock key configuration to the first lock key configuration is permitted.

6. The rotary lock assembly of claim 1, further comprising a linear output assembly configured for axial movement relative to radial movement of the lock key, and having an outer surface defining a groove between a first axial groove face and a second axial groove face, and configured to receive the lock key in the first lock key configuration and be prevented from moving linearly based on mechanical interference between the lock key and at least one of the first axial groove face and the second axial groove face.

7. The rotary lock assembly of claim 1, wherein the lock motor has a motor axial aperture defined therein, wherein the screw lead extends axially through the motor axial aperture.

8. The rotary lock assembly of claim 1, further comprising a reduction gear configured to transmit torque from the lock motor to the sun gear assembly.

9. A method of locking a linear actuator, the method comprising:
   receiving first torque from a first torque source at a sun gear assembly of an epicyclic gear assembly;
   transmitting torque from the sun gear assembly to a ring gear assembly of the epicyclic gear assembly through a planet gear assembly of the epicyclic gear assembly;
   receiving second torque from a second torque source at a screw extending through a sun gear aperture defined in the sun gear assembly;
   urging movement of a linear output member through a nut configured for linear motion based on rotation of the screw;
   urging radial displacement of a lock key from a first lock key configuration to a second lock key configuration based on linear movement of the linear output member;

contacting, based on movement of the linear actuator, the lock key with an axial groove face of a groove defined in the linear output member and configured to receive the lock key in the first lock key configuration; and preventing linear movement of the linear output member based on interference between the lock key and the axial groove face.

10. The method of claim 9, further comprising:

transmitting torque from the ring gear assembly to a lock rotor; and rotating the lock rotor from a first lock rotor configuration to a second lock rotor configuration.

11. The method of claim 10, wherein the lock rotor is configured to prevent radial displacement of a lock key from a first key configuration to a second key configuration in the first lock rotor configuration, and is configured to permit radial displacement of the lock key from the first key configuration to the second key configuration in the second lock rotor configuration.

12. The method of claim 9, wherein a planet gear carrier of the planet gear assembly is grounded relative to the sun gear assembly and the ring gear assembly.

13. The method of claim 9, wherein the first torque source is a lock motor having a motor axial aperture defined therein, wherein the screw extends axially through the motor axial aperture.

14. The method of claim 9, wherein receiving first torque from a first torque source at a sun gear assembly of an epicyclic gear assembly comprises:

receiving first torque from a first torque source at a reduction gear; and transmitting torque from the reduction gear to the sun gear assembly.

15. A linear actuator comprising:

a housing;

a rotary input member rotatably moveable relative to the housing;

a linear output member axially movable between a first output position relative the housing, and a second output position relative to the housing; and a rotary lock assembly comprising:

an epicyclic gear assembly comprising:

a sun gear assembly having a sun gear axial aperture defined therein;

a ring gear assembly;

a planet gear assembly mechanically engaged to the sun gear assembly and to the ring gear assembly;

a lock key configured for radial displacement between a first lock key configuration and a second lock key configuration; and a lock rotor configured to be rotated by the planet gear assembly between a first rotor configuration in which radial displacement of the lock key from the first lock key configuration to the second lock key configuration is prevented, and a second rotor configuration in which radial displacement of the lock key from the first lock key configuration to the second lock key configuration is permitted;

a lock motor configured to urge rotation of the sun gear assembly; and a screw lead extending axially through the sun gear axial aperture.

16. The linear actuator of claim 15, further comprising a nut engaged with the screw lead and axially movable along the screw lead in response to rotation of the screw lead.

17. The linear actuator of claim 15, further comprising a drive motor configured to urge rotation of the screw lead.

18. The linear actuator of claim 15, wherein a planet gear carrier of the planet gear assembly is grounded relative to the sun gear assembly and the ring gear assembly.

19. The linear actuator of claim 15, the rotary lock assembly further comprising:

a lock key retainer configured to be moved linearly between a first lock key retainer configuration in which radial displacement of the lock key from the second lock key configuration to the first lock key configuration is prevented, and a second lock key retainer configuration in which radial displacement of the lock key from the second lock key configuration to the first lock key configuration is permitted.

20. The linear actuator of claim 15, the rotary lock assembly further comprising a linear output assembly configured for axial movement relative to radial movement of the lock key, and having an outer surface defining a groove between a first axial groove face and a second axial groove face, and configured to receive the lock key in the first lock key configuration and be prevented from moving linearly based on mechanical interference between the lock key and at least one of the first axial groove face and the second axial groove face.

21. The linear actuator of claim 15, wherein the lock motor has a motor axial aperture defined therein, wherein the screw lead extends axially through the motor axial aperture.

22. The linear actuator of claim 15, further comprising a reduction gear configured to transmit torque from the lock motor to the sun gear assembly.

* * * * *

UNITED STATES PATENT AND TRADEMARK OFFICE
CERTIFICATE OF CORRECTION

| | | |
|---|---|---|
| PATENT NO. | : 11,746,865 B2 | |
| APPLICATION NO. | : 17/475892 | |
| DATED | : September 5, 2023 | |
| INVENTOR(S) | : Joseph Thomas Kopecek | |

It is certified that error appears in the above-identified patent and that said Letters Patent is hereby corrected as shown below:

In the Claims

In Column 13, Line 39, in Claim 15, after "relative", please insert -- to --.

Signed and Sealed this
Seventh Day of November, 2023

*Katherine Kelly Vidal*

Katherine Kelly Vidal
*Director of the United States Patent and Trademark Office*